United States Patent [19]

Kobashi et al.

[11] Patent Number: 4,804,047
[45] Date of Patent: Feb. 14, 1989

[54] ROTARY MOWER AND TILLING DEVICE

[75] Inventors: Teruhisa Kobashi; Ichiro Kobashi; Yoshio Touki; Yasuhiro Kobiki, all of Okayama, Japan

[73] Assignee: Kobashi Kogyo Co., Ltd., Okayama, Japan

[21] Appl. No.: 931,743

[22] Filed: Nov. 17, 1986

[30] Foreign Application Priority Data

Nov. 20, 1985 [JP] Japan .................. 60-261959
Nov. 22, 1985 [JP] Japan .................. 60-262957

[51] Int. Cl.⁴ .................. A01B 33/04; A01B 49/04
[52] U.S. Cl. .................. 172/91; 56/294; 172/45; 172/125
[58] Field of Search .............. 172/45, 42, 556, 123, 172/125, 91, 95, 47, 445; 56/295, 294, 12.7, 16.9, 504

[56] References Cited

U.S. PATENT DOCUMENTS

| | | | |
|---|---|---|---|
| 2,990,667 | 7/1961 | Schwalm | 56/12.7 |
| 3,028,919 | 4/1962 | Smith | 172/125 |
| 3,093,951 | 6/1963 | Barows | 172/45 X |
| 3,128,729 | 4/1964 | Henson | 56/12.7 |
| 3,557,880 | 1/1971 | van der Lely | 172/91 |
| 4,338,771 | 7/1982 | Hummel | 56/295 |
| 4,492,271 | 1/1985 | Doering | 172/43 |
| 4,519,459 | 5/1985 | Reaume | 172/42 |
| 4,556,113 | 12/1985 | Saito | 172/91 |
| 4,611,669 | 9/1986 | Ballard | 172/545 |

FOREIGN PATENT DOCUMENTS 2551857  2/1977  Fed. Rep. of Germany .

Primary Examiner—Richard J. Johnson
Attorney, Agent, or Firm—Martin A. Farber

[57] ABSTRACT

A rotary tilling device has a cutting device having a plurality of cutters each of which is rotatably mounted by a bolt on a supporting member at a base end thereof. The cutter has a vertical portion and a lateral portion at an end of the vertical portion and has edges on both sides of the vertical and lateral portions. A stopper for receiving the cutter in a tilling position and a spring plate for resiliently holding the cutter in the tilling position are provided on the supporting member.

10 Claims, 9 Drawing Sheets

ROTARY MOWER AND TILLING DEVICE

BACKGROUND OF THE INVENTION

The present invention relates to a mounting structure for cutters for a rotary tilling device having a rotary cutting device.

The rotary cutters in the rotary cutting device rotate downwardly or upwardly in the soil to break up the surface soil. The conventional rotary tilling device is used for only cultivating the soil and is not contructed to perform other work such as mowing.

The applicant proposed a rotary tilling device which is also used for mowing by a rotary cutter device in the opposite direction. In the rotary tilling device, each cutter is rotatably mounted on a pivotal member such as a bolt secured to a supporting member and held at an angular position by a stopper when tilling.

However, in such rotary tilling device, a lateral gap is provided between the cutter and fastening means in order to allow it to rotate about the bolt. Accordingly, load exerted on the cutter during tilling operation causes shifting thereof in the lateral direction of the tilling device (in the axial direction of the bolt). The continuous lateral shifting or reciprocating of the cutter decreases the workability of the device. Further, since the cutter is rotatable about the bolt in the opposite direction when tilling, the cutter may swing during operation, which causes unstable tilling operation.

SUMMARY OF THE INVENTION

Accordingly, an object of the present invention is to provide a mounting structure which may secure each cutter in the tilling position when tilling and may release the cutter when mowing.

According to the present invention, there is provided a rotary tilling device comprising, a rotary shaft rotatably supported on frame means, a plurality of supporting members secured to the rotary shaft, at least two cutters rotatably mounted by a bolt on each of the supporting members at opposite positions thereof, each of the cutters having a vertical portion, a base end portion at which the cutter is rotatable about the bolt, and a lateral portion bent at another end of the vertical portion in the axial direction of the rotary shaft, and having a soil cutting edge and a grass cutting edge on both sides of the vertical and lateral portions, holding means provided on the supporting member for holding the cutter in the soil cutting position and for releasing the cutter in the grass cutting position, and transmitting means for transmitting power of a tractor to the rotary shaft to rotate it.

In an aspect of the invention, the holding means comprises a stopper provided on the supporting member.

The other objects and features of this invention will become understood from the following description with reference to the accompanying drawings.

BRIEF DESCRIPTION OF THE DRAWINGS

FIG. 2b is a sectional view of FIG. 2a;

FIG. 8b is a sectional view taken along a line VIII—VIII of FIG. 8a;

FIG. 9b is a sectional view of the device of FIG. 9a;

FIG. 12b is a sectional view of the device of FIG. 12a.

DETAILED DESCRIPTION OF THE DRAWINGS

Figure 1:
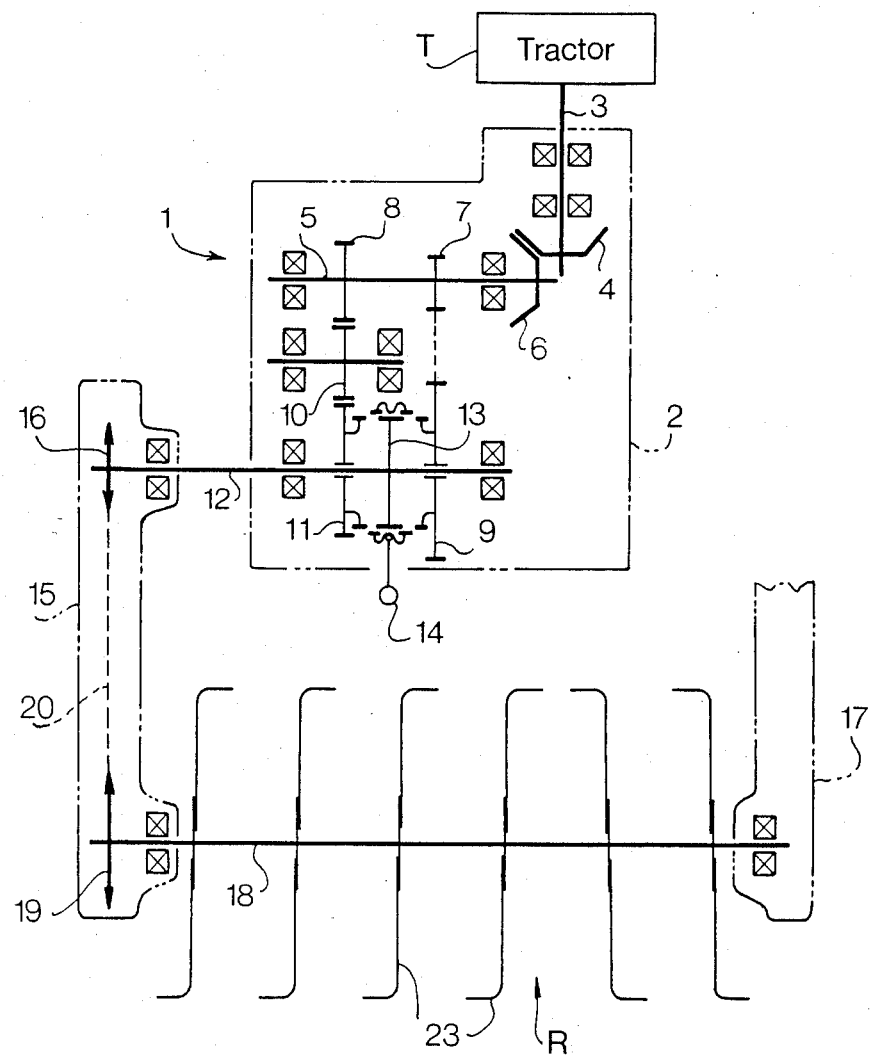
FIG. 1 is a schematic diagram showing a power transmission system of rotary tilling device of the present invention.

Referring to FIG. 1, a rotary tilling device 1 according to the present invention is adapted to be drawn by a tractor T and attached thereto by a three-point linkage (not shown) so as to be lowered and raised. The rotary tilling device 1 has a gearbox 2 provided at a middle portion relative to the lateral direction thereof, an output shaft 12 projecting from the gearbox 2, a downwardly extending chain case 15 from the end of the output shaft 12, and supporting frame 17 provided at the other side of the machine. The gearbox 2 has an input shaft 3, one end of which is connected to the tractor T by way of an universal joint, transmission shaft and power take-off shaft. A bevel gear 4 fixedly mounted on the other end of the input shaft 3 engages with a bevel gear 6 mounted on an intermediate shaft 5. A gear 7 secured to the intermediate shaft 5 is engaged with a gear 9 rotatably mounted on the output shaft 12, providing a large reduction ratio. A gear 8 also securely mounted on the intermediate shaft 5 engages an idler gear 10 which in turn engages a counter gear 11 rotatably mounted on the ouput shaft 12. Between the gears 9 and 11, a shift gear 13 is slidably secured by a spline engagement to the output shaft 12. The gear 13 is selectively engaged with gears 9 and 11, in order to operatively connect the gear 9 or 11 with the output shaft 12. A shift lever 14 projecting from the gear box 2 is connected with the slidable gear 13 for the selecting operation. The output shaft 12 has a sprocket wheel 16 at an end portion. The sprocket wheel 16 is connected to a sprocket wheel 19 fixedly mounted on a rotary shaft 18 through a chain 20. The rotary shaft 18 is rotatably supported on lower portions of the chain case 15 and the supporting frame 17.

Figure 2A:
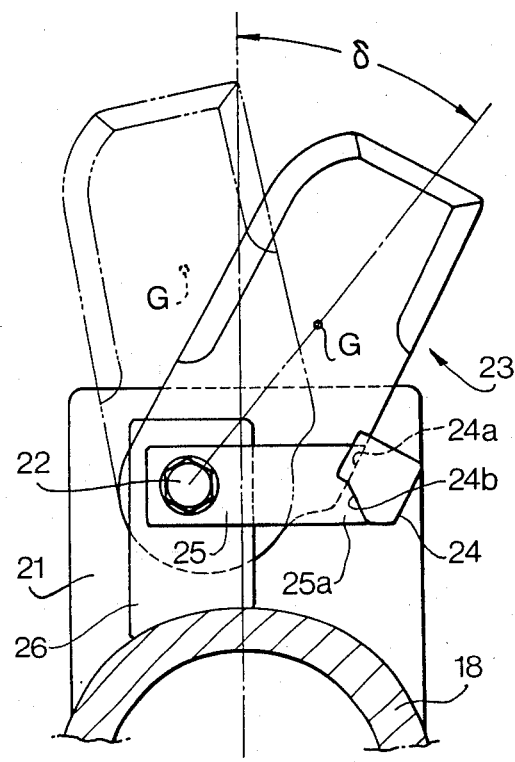
FIG. 2a is a side elevational view showing a mounting structure of a cutter of the rotary tilling device of FIG. 1.
Figure 2B:
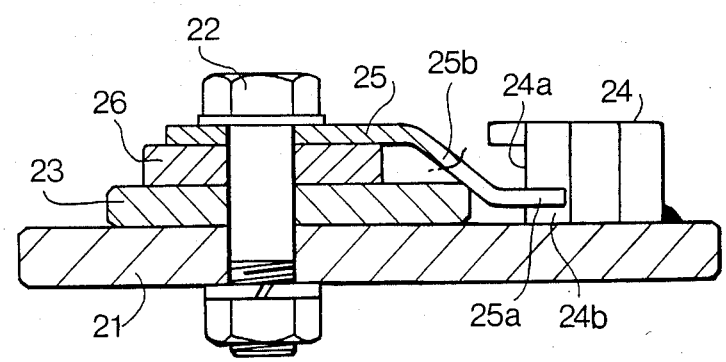
Figure 5A:
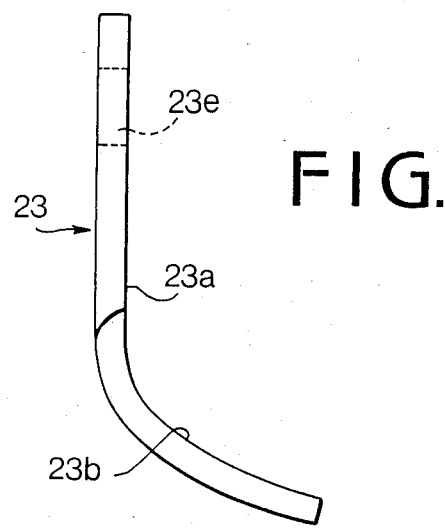
FIG. 5a is a front elevational view of a cutter.
Figure 5B:
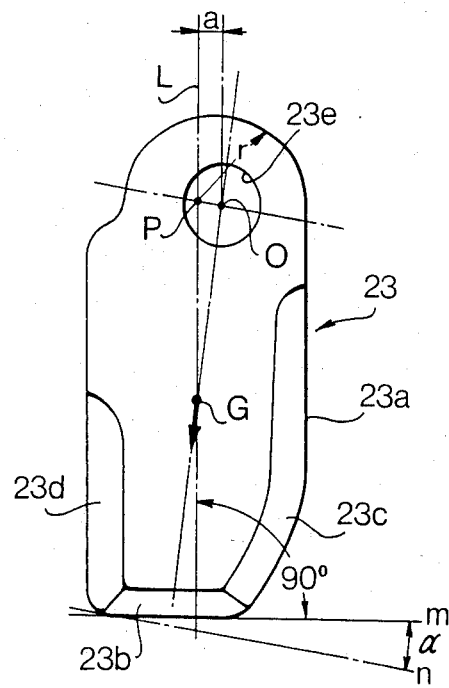
FIG. 5b is a side elevational view of the cutter.
Figure 5C:
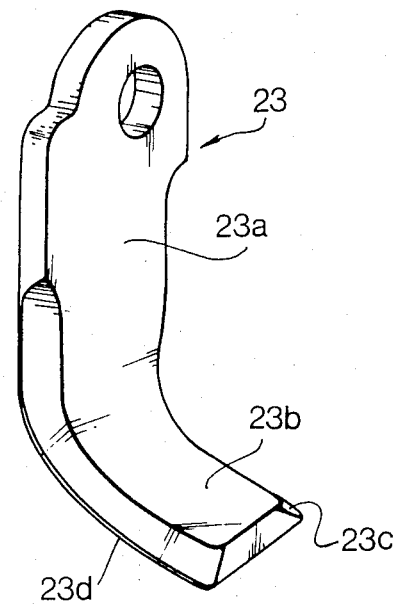
FIG. 5c is a perspective view showing a cutter.

A rotary cutting device R has a plurality of supporting members 21 (FIG. 2a) radially and securely mounted on the rotary shaft 18. On opposite end portions of the supporting members 21, cutters 23 are pivotally supported by pivot bolts 22, respectively. As shown in FIGS. 5a to 5c, each cutter 23 is made by bending a rectangular metal plate to form a vertical portion 23a and a lateral portion 23b thereby forming an L shape section. A soil cutting edge 23c and a grass cutting edge 23d are formed on opposite sides of a lower portion of the vertical portion 23a and on opposite sides of the lateral portion 23b, edge 23c being for tilling and 23d for mowing. A shown in FIGS. 2a and 2b, a holding plate 26 is secured to shaft 18 by welding, the cutter 23 is disposed between the supporting member 21 and holding plate 26. A stopper 24 is provided on the supporting member 21 to receive the load exerted on the cutter 23. As shown in FIGS. 2a and 2b, the stopper 24 has an abutment side 24a against which one side of the cutter 23 abuts. In a tilling position shown by a solid line in FIG. 2a, the cutter has an angular disposition for tilling. The stopper 24 is so positioned to assure that the cutter 23 is inserted into the soil at a certain entering angle δ(FIG. 2b) for efficient inverting and turning of soil.

Figure 3:
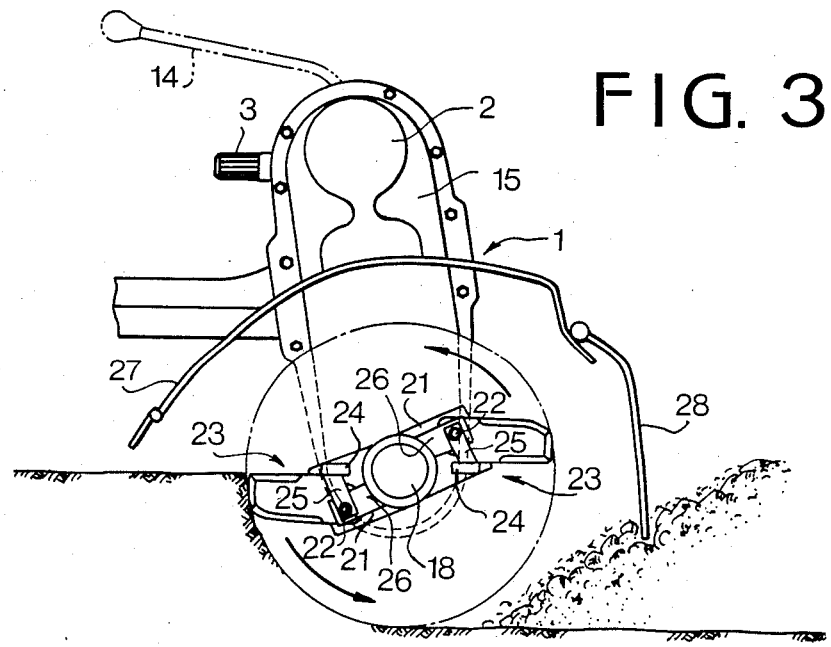
FIG. 3 is a side elevational of the rotary tilling device during tilling operation.

In order to prevent the lateral shifting of the cutter 23, a spring plate 25 is attached on the bolt 22. The spring plate 25 has a bent portion 25b engaging with the cutter 23 to urge it towards the supporting member 21. The spring plate 25 has a protruding portion 25a which engages with a notch 24b of the stopper 24 as shown in FIG. 2a, so that the spring plate is prevented from rotating about the bolt 22. As shown in FIG. 3, covers 27 an 28 are provided above the front and rear portions of the rotary tilling device 1.

For effective grass cutting, it is preferable to mount the cutter 23 on the supporting member 21 so as to form a certain angle between the surface of the ground and the bottom of the cutter 23. As shown in FIG. 5b, in the cutter 23 of the present invention, the center O of a hole 23e for securing the cutter by bolt 22 is offset by a mm from a center line L of the cutter 23 towards the soil cutting edge 23c. A bottom line m of the cutter 23, which is at a right angle to the center line L, and line n, which is at a right angle to a line indicating the direction of the centrifugal force, intersecting the center O and the center G of gravity, make an appropriate cutting angle α.

The operation of the machine is described hereinafter.

For the tilling operation, the shift lever 14 is shifted so that the shift gear 13 is in engagement with the gear 9. Accordingly, the power of the engine supplied to the input shaft 3 is transmitted to the output shaft 12 through bevel gears 4 and 6, and gears 7 and 9. The power is further transmitted to the rotary shaft 18 through the sprocket wheels 16, 19 and the chain 20. Accordingly, the rotary shaft 18 is rotated at a low speed in the tiling direction. As shown in FIG. 3, as the tractor draws the rotary tilling device 1, the edge 23c (compare FIG. 5b) of each cutter 23 cuts through the soil to cultivate the surface of the soil. The abutment side 24a (compare FIG. 2a) of the stopper 24 holds the cutter 23 at one side thereof preventing the cutter 23 from further rotating in the counter-tilling direction due to the load exerted on the cutter 23. Thus, the soil is cultivated by the tilling device. Since the cutter 23 is urged to the supporting member 21 by bent portion 25b of the spring plate 25, it is restrained from deflecting in the axial direction of the bolt 22.

Figure 4:
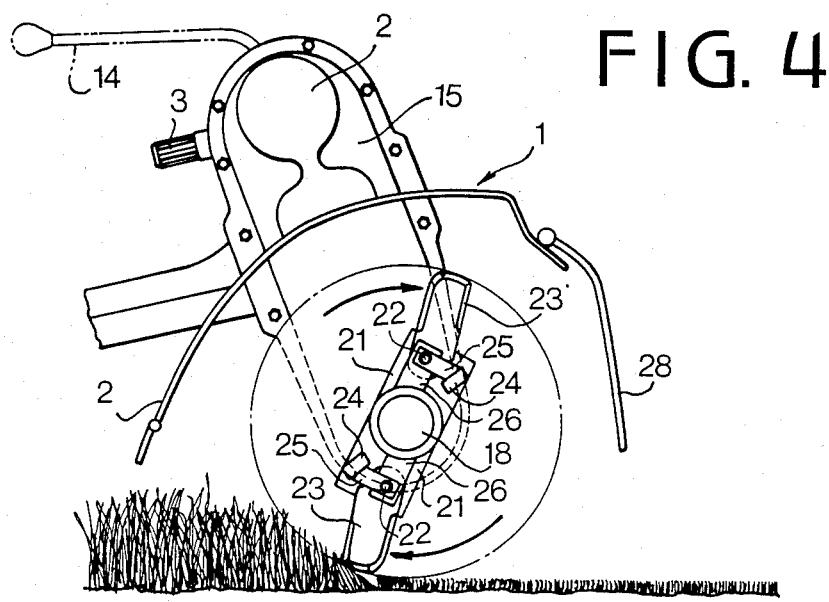
FIG. 4 is a side elevational view of the rotary tilling device during grass cutting operation.

When the shift lever 14 is shifted to engage the shift gear 13 with the reverse gear 11, the device is in the state for the grass cutting operation (FIG. 4 and chain line in FIG. 2a).

The direction of the rotation of the rotary shaft 18 is reversed compared to the tilling direction, as shown in FIG. 2a and FIGS. 3 and 4. Since reverse gear 11 is smaller than gear 9, the speed of the rotation of the rotary shaft 18 is faster than the tilling operation thereby generating a large centrifugal force. Accordingly, the cutter 23 is disengaged from the stopper 24 and rotates about the bolt 22 and is held at a radial position shown by a chain line of FIG. 2a. As a result, grass growing on unplowed land is cut in the same manner as a conventional rotary flail-type cutter.

FIGS. 6 to 10 show other embodiments of the present invention. The same numerals as those in the first embodiment designate the same parts.

Figure 6:
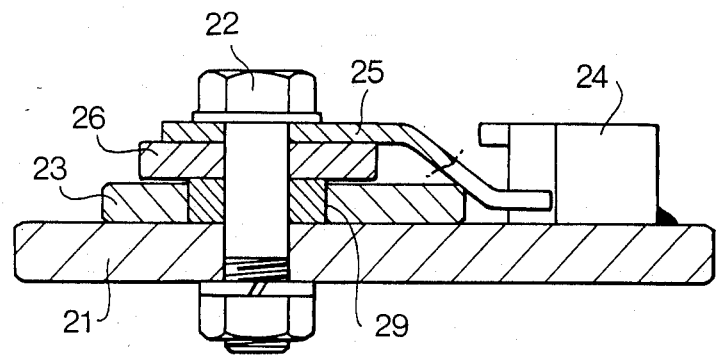
FIG. 6 is a sectional view showing a mounting structure of a cutter n a second embodiment.

Referring to FIG. 6, the second embodiment has the same construction as the first embodiment except that that a collar 29 having a thickness slightly larger than the cutter 23 is embedded in the hole 23e of the cutter. Therefore, the holding plate 26 is firmly pressed against the supporting member 21 through via the collar 29, keeping a lateral gap between the cutter 23 and the holding plate 26 to allow the cutter to rotate freely for the mowing operation.

Figure 7:
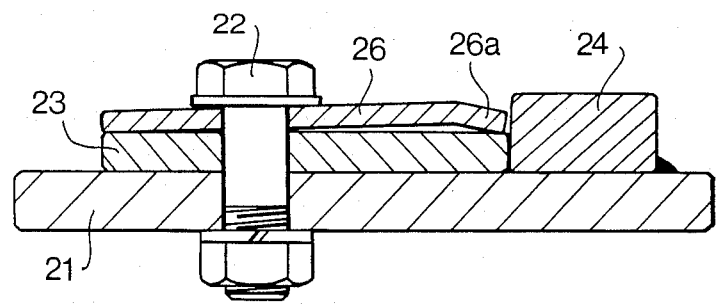
FIG. 7 is a sectional view showing a mounting structure in a third embodiment.

In the third embodiment shown in FIG. 7, the spring plate 25 in the previous embodiments is omitted. The holding plate 26 of the present embodiment has an extension having elasticity in the lateral direction of the supporting member 21. Namely, the holding plate 26 is bent toward the supporting member 21 at a portion adjacent the stopper 24, thereby forming a bent portion 26a. When the cutter 23 is in a position for tilling, the cutter 23 is inserted between the supporting member 21 and the bent portion 26a so as to be securely held without deflecting in the axial deflection of the bolt 22.

Figure 8A:
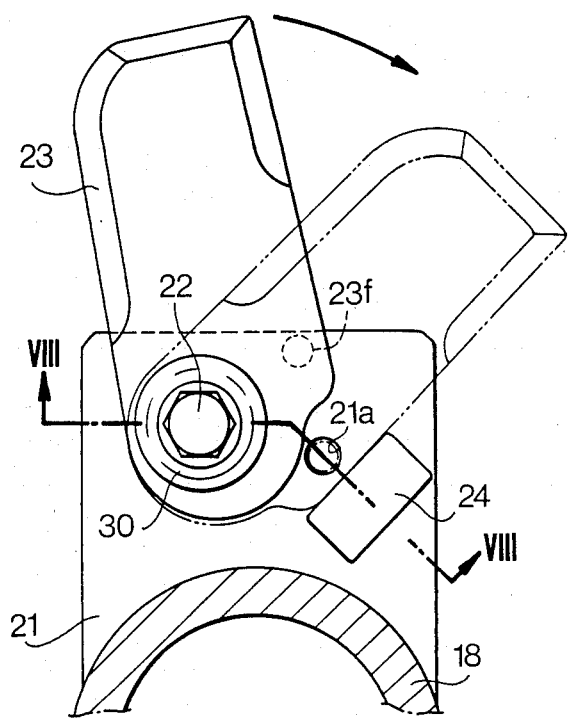
FIG. 8a is a side elevational view showing a mounting structure in a fourth embodiment.
Figure 8B:
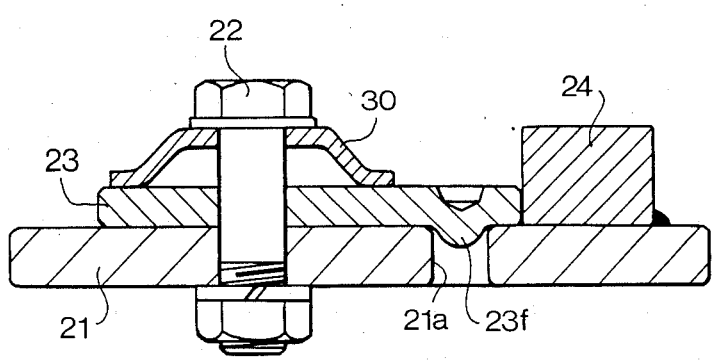

In the fourth embodiment shown in FIGS. 8a and 8b, a disk spring 30 is provided instead of spring plate 25. The cuttter 23 has a projection 23f which engages with a hole 21a formed in the supporting member 21 when the cutter 23 is at a tilling position. Accordingly, the cutter 23 is rigidly mounted on the supporting member 21 and locked in the tilling position shown by a chain line in FIG. 8a by the engagement of the projection 23f and the hole 21a.

Figure 9A:
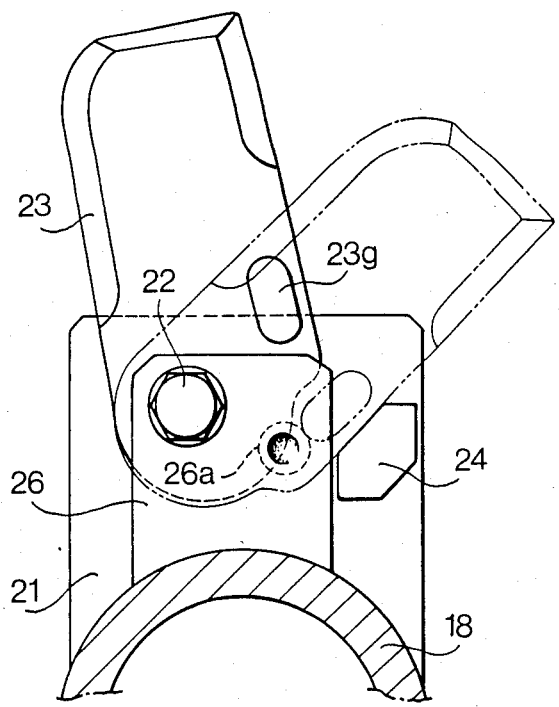
FIG. 9a is a side elevational view of a fifth embodiment.
Figure 9B:
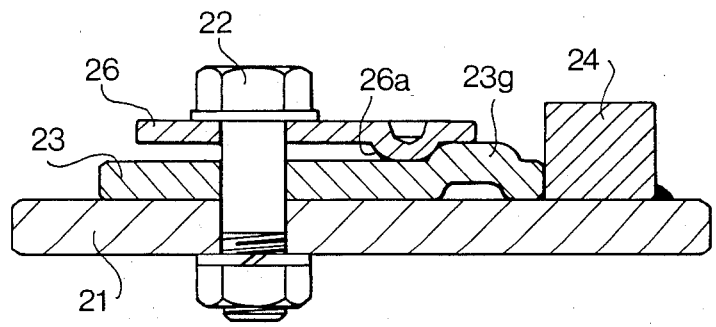

Referring to FIGS. 9a and 9b, the cutter 23 in the fifth embodiment is provided with an elongated projection 23g. The holding plate 26 has a projection 26a. The projections 23g and 26a are adapted to engage with each other with high friction while cutter 23 is held at the tilling position shown by a chain line in FIG. 9a. Accordingly, the movement of the cutter 23 is restricted by the projection 26a thereby preventing reciprocating movement thereof between the mowing position shown by a solid line and the tilling position.

Figure 10:
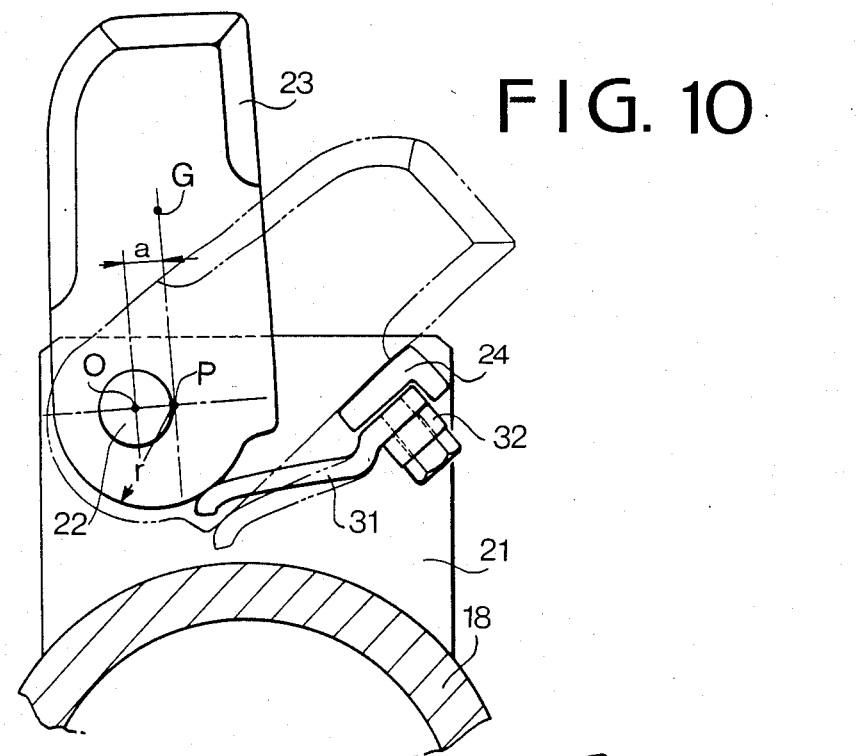
FIG. 10 is a side view of a sixth embodiment.

In the sixth embodiment shown in FIG. 10, a bracket 32 to which one end of a leaf spring 31 is secured, is attached to the supporting member 21 below the stopper 24. At the mowing position, the other end portion of the leaf spring 31 abuts against the base portion formed in semicircle having a radius r about a center P. When the cutter 23 is rotated to a tilling position, the leaf spring 31 is biased to abut against the sides of the vertical portion 23a of the cutter 23 opposite the soil cutting edge 23c, so that the force of the leaf spring 31 is exerted thereon above the center O. Accordingly, the cutter 23 is resiliently held in the tilling position.

Figure 11:
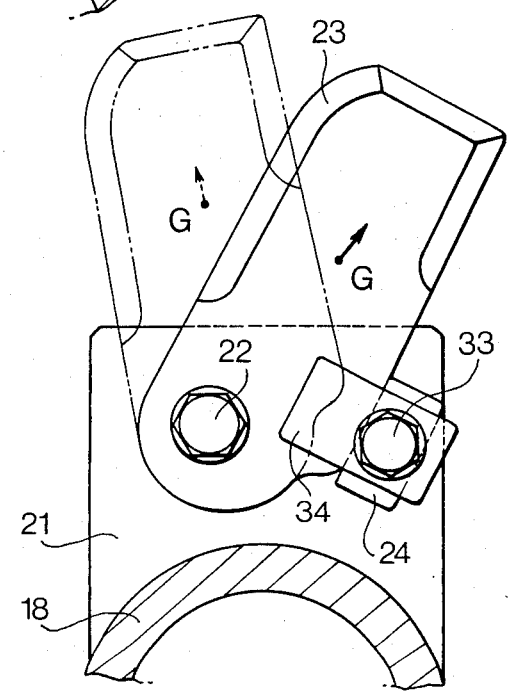
FIG. 11 is a sectional view showing a mounting structure in a seventh embodiment.

Referring to FIG. 11, the stopper 24 is secured to the supporting member 21 by a shear bolt 33 together with a spring plate 34. The spring plate 34 prevents the cutter 23 from deflecting in the axial direction of the bolt. If excessive load is exerted on the cutter 23 during tilling operation, the shear bolt 33 is sheared so that the stopper 24 no longer holds the cutter 23. Accordingly, the cutter 23 is rotated in counter-tilling direction without any damage. After the shear bolt 33 has been replaced by a new one, the rotary cutting device is ready for operation.

Figure 12A:
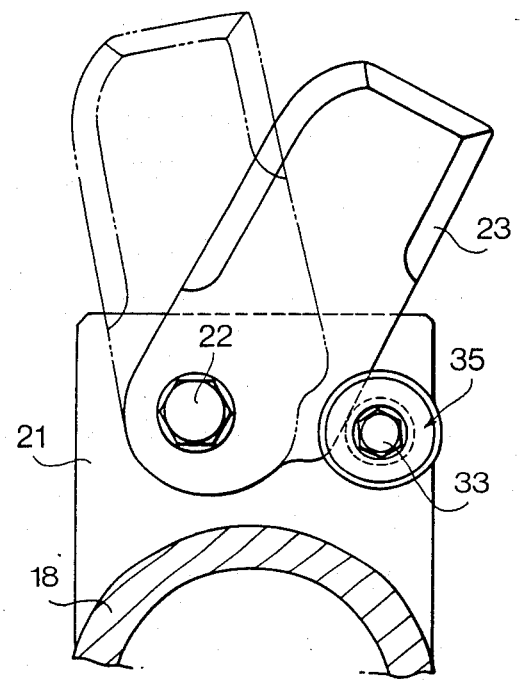
FIG. 12a is a side elevational view of an eighth embodiment.
Figure 12B:
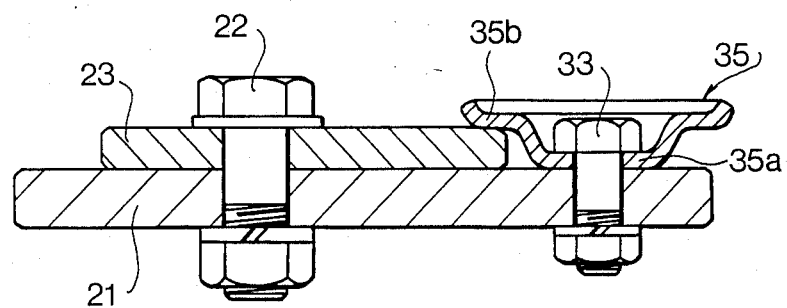

FIGS. 12a and 12b show another embodiment employing such a shear bolt 33. A disk spring 35 serves both as stopper 24 and spring plate 34 of the embodiment described in FIG. 11. As shown in FIG. 12a, the disk spring 35 employed in the present embodiment consists of a central portion 35a and a flange 35b. The central portion serves to stop the further rotation of the cutter 23 in the counter-tilling direction during the tilling operation. At the same time, the cutter 23 is interposed between the flange 35b and the supporting member 21. Since the disk spring 35 need not be orientated in any particular direction, it is not required to secure the disk spring 35 to other parts of the device such as the rotary shaft 18. In the event of overloading, the shear bolt 33 works in the same way as in the afore-described embodiment so that the disk spring 35 falls off, allowing the cutter 23 to rotate freely.

While the presently referred embodiments of the present invention have been shown and described, it is to be understood that this disclosure is for the purpose of illustration and that various changes and modifications may be made without departing from the spirit and scope of the invention as set forth in the appended claims.

What is claimed is:
1. A rotary tilling device comprising:
a frame;
a rotary shaft rotatably supported on said frame;
a plurality of supporting members centrally secured to the rotary shaft;
at least two cutters pivotally mounted by a bolt on each of the supporting members at opposite positions thereof;
each of the cutters having a vertical portion, the latter at one end having a base end portion at which the cutter is pivoted about the bolt, and a lateral portion bent at another end of the vertical portion in the axial direction of the rotary shaft, and having a soil cutting edge and a grass cutting edge on both sides of the vertical and lateral portions;
holding means provided on the supporting member for holding the cutter in a first pivoted soil cutting tilling position and for releasing the cutter in a second pivoted grass cutting position;
said holding means comprises a stopper mounted on the supporting member for engaging the cutter when the latter is pivoted thereagainst in the tilling position;
transmitting means for transmitting power of a tractor to the rotary shaft to rotate it;
selector means for selectively rotating the rotary shaft in opposite directions and for rotating the rotary shaft in a grass cutting direction at a higher speed than a soil cutting direction;
a holding member fixedly secured to said rotary shaft with said bolt passing through said holding member with said cutter between said holding member and said supporting member; and
a spring at one end thereof engaging said bolt and having a bent portion pressing said cutter to said supporting member so as to restrain said cutter from deflecting in the axial direction of the bolt, said spring having another end engaging in a notch in said stopper when said cutter is in the tilling position such that said spring is prevented from rotation.

2. The rotary tilling device according to claim 1, wherein
said holding member is a rectangular plate and is disposed between said one end of the spring and said cutter.

3. The rotary tilling device according to claim 1, wherein
said spring is a spring plate.

4. The rotary tilling device according to claim 1, wherein:
said cutter has an elongated projection;
said holding member has a projection; and
said projections are formed so as to engage each other with high friction when said cutter is in said tilling position, thereby restricting movement of the cutter.

5. A rotary tilling device comprising:
a frame;
a rotary shaft rotatably supported on said frame;
a plurality of supporting members centrally secured to the rotary shaft;
at least two cutters pivotally mounted by a bolt on each of the supporting members at opposite positions thereof;
each of the cutters having a vertical portion, the latter at one end having a base end portion at which the cutter is pivoted about the bolt, and a lateral portion bent at another end of the vertical portion in the axial direction of the rotary shaft, and having a soil cutting edge and a grass cutting edge on both sides of the vertical and lateral portions;
holding means provided on the supporting member for holding the cutter in a first pivoted soil cutting tilling position and for releasing the cutter in a second pivoted grass cutting position;
said holding means comprises a stopper mounted on the supporting member for engaging the cutter when the latter is pivoted thereagainst in the tilling position;
transmitting means for transmitting power of a tractor to the rotary shaft to rotate it;
selector means for selectively rotating the rotary shaft in opposite directions and for rotating the rotary shaft in a grass cutting direction at a higher speed than a soil cutting direction;
a holding member fixedly secured to said rotary shaft with said bolt passing through said holding member with said cutter between said holding member and said supporting member;
said cutter has a hole through which said bolt extends;
a collar having a thickness slightly larger than that of said cutter, is embedded in said hole;
said holding member abuts said collar leaving a lateral gap between said cutter and said holding member, whereby said cutter can freely pivot to the first and second pivoted positions; and
a spring at one end thereof engaging said bolt and having a bent portion pressing said cutter to said supporting member so as to restrain said cutter from deflecting in the axial direction of the bolt, said spring having another end engaging in a notch in said stopper when said cutter is in the tilling positon such that said spring is prevented from rotation.

6. A rotary tilling device comprising:
a frame;
a rotary shaft rotatably supported on said frame;
a plurality of supporting members centrally secured to the rotary shaft;
at least two cutters pivotally mounted by a bolt on each of the supporting members at opposite positions thereof;
each of the cutters having a vertical portion, the latter at one end having a base end portion at which the cutter is pivoted about the bolt, and a lateral portion bent at another end of the vertical portion in the axial direction of he rotary shaft, and having a soil cutting edge and a grass cutting edge on both sides of the vertical and lateral portions;
holding means provided on the supporting member for holding the cutter in a first pivoted soil cutting tilling position and for releasing the cutter in a second pivoted grass cutting position;
said holding means comprises a stopper mounted on the supporting member for engaging the cutter when the latter is pivoted thereagainst in the tilling position;
transmitting means for transmitting power of a tractor to the rotary shaft to rotate it;
selector means for selectively rotating the rotary shaft in opposite directions and for rotating the rotary shaft in a grass cutting direction at a higher speed than a soil cutting direction;
a disk spring pressing said cutter to said supporting member and mounted on said bolt with said cutter between said spring and said supporting member; and
said cutter has a projection engaging a hole in the supporting member adjacent said stopper when said cutter is in said tilling position locking said cutter on said supporting member abutting said stopper.

7. A rotary tilling device comprising:
a frame;
a rotary shaft rotatably supported on said frame;
a plurality of supporting members centrally secured to the rotary shaft;
at least two cutters pivotally mounted by a bolt on each of the supporting members at opposite positions thereof;
each of the cutters having a vertical portion, the latter at one end having a base end portion at which the cutter is pivoted about the bolt, and a lateral portion bent at another end of the vertical portion in the axial direction of the rotary shaft, and having a soil cutting edge and a grass cutting edge on both sides of the vertical and lateral portions;
holding means provided on the supporting member for holding the cutter in a first pivoted soil cutting tilling position and for releasing the cutter in a second pivoted grass cutting position;
said holding means comprises a stopper mounted on the supporting member for engaging the cutter when the latter is pivoted thereagainst in the tiling position;
transmitting means for transmitting power of a tractor to the rotary shaft to rotate it;
selector means for selectively rotating the rotary shaft in opposite directions and for rotating the rotary shaft in a grass cutting direction at a higher speed than a soil cutting direction;
a holding member fixedly secured to said rotary shaft with said bolt passing through said holding member with said cutter between holding member and said supporting member;
said cutter has an elongated projection;
said holding member has a projection; and
said projections are formed so as to engage each other with high friction when said cutter is in said tilling position, thereby restricting movement of the cutter.

8. A rotary tilling device comprising:
a frame;
a rotary shaft rotatably supported on said frame;
a plurality of supporting members centrally secured to the rotary shaft;
at least two cutters pivotally mounted by a bolt on each of the supporting members at opposite positions thereof;
each of the cutters having a vertical portion, the latter at one end having a base end portion at which the cutter is pivoted about the bolt, and a lateral portion bent at another end of the vertical portion in the axial direction of the rotary shaft, and having a soil cutting edge and a grass cutting edge on both sides of the vertical and lateral portions;
holding means provided on the supporting member for holding the cutter in a first pivoted soil cutting tilling position and for releasing the cutter in a second pivoted grass cutting position;
said holding means comprises a stopper mounted on the supporting member for engaging the cutter when the latter is pivoted thereagainst in the tilling position;
transmitting means for transmitting power of a tractor to the rotary shaft to rotate it;
selector means for selectively rotating the rotary shaft in opposite directions and for rotating the rotary shaft in a grass cutting direction at a higher speed than a soil cutting direction; and
a leaf spring secured to said supporting member adjacent said stopper, said leaf spring having an end abutting said base end portion, formed as a semicircle in the grass cutting position, and abutting a side of said vertical portion of the cutter opposite the soil cutting edge above the axis of said bolt in the tilling position, respectively, of said cutter.

9. A rotary tilling device comprising:
a frame;
a rotary shaft rotatably supported on said frame;
a plurality of supporting members centrally secured to the rotary shaft;
at least two cutters pivotally mounted by a bolt on each of the supporting members at opposite positions thereof;
each of the cutters having a vertical portion, the latter at one end having a base end portion at which the cutter is pivoted about the bolt, and a lateral portion bent at another end of the vertical portion in the axial direction of the rotary shaft, and having a soil cutting edge and a grass cutting edge on both sides of the vertical and lateral portions;
holding means provided on the supporting member for holding the cutter in a first pivoted soil cutting tilling position and for releasing the cutter in a second pivoted grass cutting position;

said holding means comprises a stopper mounted on the supporting member for engaging the cutter when the latter is pivoted thereagainst in the tilling position;

transmitting means for transmitting power of a tractor to the rotary shaft to rotate it;

selector means for selectively rotating the rotary shaft in opposite directions and for rotating the rotary shaft in a grass cutting direction at a higher speed than a soil cutting direction;

a spring plate; and said stopper is secured to said supporting member by a shear bolt together with said spring plate, the latter pressing the cutter to the supporting member preventing axial deflection of the cutter.

10. A rotary tilling device comprising:

a frame;

a rotary shaft rotatably supported on said frame;

a plurality of supporting members centrally secured to the rotary shaft;

at least two cutters pivotally mounted by a bolt on each of the supporting members at opposite positions thereof;

each of the cutters having a vertical portion, the latter at one end having a base end portion at which the cutter is pivoted about the bolt, and a lateral portion bent at another end of the vertical portion in the axial direction of the rotary shaft, and having a soil cutting edge and a grass cutting edge on both sides of the vertical and lateral portions;

holding means provided on the supporting member for holding the cutter in a first pivoted soil cutting tilling position and for releasing the cutter in a second pivoted grass cutting position;

said holding means comprises a stopper mounted on the supporting member for engaging the cutter when the latter is pivoted thereagainst in the tilling position;

transmitting means for transmitting power of a tractor to the rotary shaft to rotate it;

selector means for selectively rotating the rotary shaft in opposite directions and for rotating the rotary shaft in a grass cutting direction at a higher speed than a soil cutting direction;

said stopper comprises a disk spring; and a shear bolt secures said disk spring to said supporting member, said spring having a flange overlapping and pressing the cutter to the supporting member preventing axial deflection of the cutter when said cutter is in the tilling position, said spring having a central frustoconical portion tapering toward said supporting plate.

* * * * *